United States Patent [19]

Lippmann et al.

[11] Patent Number: 5,325,314

[45] Date of Patent: Jun. 28, 1994

[54] ELECTRONIC GAUGE TRANSFORM

[75] Inventors: Raymond Lippmann, Ann Arbor; James E. Nelson, Waterford; Michael J. Schnars, Clarkston; James R. Chintyan, Davison; Mark C. Hansen, Ann Arbor, all of Mich.

[73] Assignee: Delco Electronics Corporation, Kokomo, Ind.

[21] Appl. No.: 944,140

[22] Filed: Sep. 11, 1992

[51] Int. Cl.$^5$ .................... G06F 13/00; G06F 15/20
[52] U.S. Cl. .................... 364/571.04; 73/313; 341/170; 364/509; 364/562
[58] Field of Search ............... 73/313, 308, 290, 430; 364/509, 510, 571.01–571.08, 562; 340/870.38, 644; 341/170

[56] References Cited

U.S. PATENT DOCUMENTS

| | | | |
|---|---|---|---|
| 3,115,615 | 12/1963 | Saper | 340/37 |
| 3,983,549 | 9/1976 | Akita et al. | 340/206 |
| 3,990,073 | 11/1976 | Duttweiler | 341/170 |
| 4,102,191 | 7/1978 | Harris | 73/313 |
| 4,243,974 | 1/1981 | Mack | 340/347 |
| 4,250,750 | 2/1981 | Martinec et al. | 73/308 |
| 4,309,692 | 1/1982 | Crosby | 340/347 |
| 4,386,406 | 5/1983 | Igarashi et al. | 364/442 |
| 4,470,296 | 9/1984 | Kobyashi et al. | 73/113 |
| 4,481,597 | 11/1984 | Robbins | 364/604 |
| 4,546,343 | 10/1985 | Higgins et al. | 340/347 |
| 4,614,114 | 9/1986 | Matsumoto et al. | 73/313 |
| 4,635,043 | 1/1987 | Kronenberg et al. | 340/618 |
| 4,731,730 | 3/1988 | Hedrick et al. | 364/509 |
| 4,760,736 | 8/1988 | Huynh | 73/430 |
| 4,768,377 | 9/1988 | Habelmann et al. | 73/313 |
| 4,810,953 | 3/1989 | Huynh | 324/120 |
| 4,890,491 | 1/1990 | Vetter et al. | 73/290 |
| 4,897,822 | 1/1990 | Korten et al. | 367/124 |
| 4,908,783 | 3/1990 | Maier | 364/509 X |
| 4,912,646 | 3/1990 | Cerruti | 364/509 |
| 4,916,535 | 4/1990 | Volodchenko et al. | 358/101 |
| 4,926,360 | 5/1990 | Spink, Jr. | 364/571.01 |
| 4,949,029 | 8/1990 | Cooper et al. | 364/571.04 |
| 5,095,452 | 3/1992 | Kanemaru | 364/571.04 X |
| 5,119,320 | 6/1992 | Ito et al. | 364/571.01 |
| 5,210,778 | 5/1993 | Massart | 364/571.05 X |
| 5,228,340 | 7/1993 | Kataoka et al. | 364/509 X |

OTHER PUBLICATIONS

Electronic Circuits-Digital and Analog, Charles A. Holt, pp. 794–795, 1978.

*Primary Examiner*—Kevin J. Teska
*Attorney, Agent, or Firm*—Jimmy L. Funke

[57] ABSTRACT

An apparatus for applying a curve transfer function to an input signal comprises a first set of memory for storing values representing boundary points or distance differences along a curve of the transfer function, a second set of memory for storing slope values of lines connecting adjacent boundary points along the curve, a counter unit for maintaining a position count indicating position along the curve of the transfer function with respect to the stored boundary point values, an addressing unit, responsive to the position count, for selecting, from the second set of memory memory, the slope value corresponding to the position count, an accumulator for adding the selected slope value to an accumulator output value; and a comparator and data latch for determining when the accumulator output value corresponds to the input signal, and for selecting the corresponding accumulator output value as an output signal representing the application of the curve transfer function to the input signal.

15 Claims, 7 Drawing Sheets

ELECTRONIC GAUGE TRANSFORM

The subject of this specification is related to copending U.S. patent Ser. Nos. 07/944,158, entitled "Slew Rate Limiter with Asymmetrical Operation," 07/944,154, entitled "Fuel Wobbler," 07/944,145, entitled "Maintaining Ratiometric Data in Electronically Manipulated Signal Processing Systems," and 07/943,964, entitled "Gauge Glider," all filed concurrently with this specification, assigned to the assignee of this invention and the disclosures of which are incorporated herein by reference.

This invention pertains to the processing of data used to drive parameter displays, and more particularly to an apparatus for compensating for nonlinearities in a parameter display system.

BACKGROUND OF THE INVENTION

In vehicles, parameter measurement and display systems such as fuel gauge systems may be very nonlinear. This nonlinearity can be caused by several factors, including nonlinearity in the parameter measurement device, such as the sender, irregularity in the shape of the parameter vessel, such as the fuel tank, and nonlinearity in the display device itself, such as the analog gauge or digital display. All of these factors may add up to a total system nonlinearity.

The result of this nonlinearity may be noticed by many vehicle operators during a period of driving when, for example, the fuel gauge takes a long time go from "full" to "¾ full," but appears to go from "¼ full" to "empty" faster.

A known method of compensating for system nonlinearities is to use a ROM (or equivalent) look-up table between system circuitry and the display device. The ROM look-up table is addressed by a digital signal from the measurement circuitry representative of the parameter measurement. The ROM contains data, at that address, which drives the display device to an accurate reading of the parameter measurement. The relation between the ROM input address and output data may correspond to points along a curve that represents the system nonlinearity, so that, as a result, the display is driven linearly.

Look-up tables require a large amount of memory, which in turn requires a large amount of silicon area and may be relatively expensive. A major benefit of look-up tables is that they can be programmed, meaning that the only adaptation necessary for different systems with different nonlinearities is re-programming of the data in the memory. What is desired is circuitry to compensate for system nonlinearities, that maintains the adaptability of look-up tables but does not require the silicon area or the expense.

SUMMARY OF THE PRESENT INVENTION

This invention provides a circuit apparatus which may be used in parameter measurement and display systems to compensate for system nonlinearities. The circuit apparatus of this invention requires minimum silicon area and may be adapted to specific system implementations by simply programming a few memory locations.

This invention operates to implement into the system a piece-wise linear approximation to a curve transfer function which compensates for system nonlinearities. The curve of the transfer function is divided at boundary points, with the part of the curve between each boundary point approximated as a straight line. The distances between the boundary points and the slopes of the lines between the boundary points are stored in memory and are used with a counter and an accumulator to approximate the curve transfer function in a piece-wise linear manner for the position of the curve of the input data signal, wherein the output signal provides the desired linear system response.

The apparatus of this invention comprises a first memory means for storing values representing the distances between boundary points along a curve of the transfer function, a second memory means for storing slope values of lines connecting adjacent boundary points along the curve, a counter means for maintaining a position count indicating position along the curve of the transfer function with respect to the stored boundary point difference values, a means, responsive to the position count, for selecting, from the first memory means, the slope value corresponding to the position count, an accumulator means for adding the selected slope value to an accumulator output value, and means for determining when the accumulator output value corresponds to the input signal and for selecting the corresponding accumulator output value as an output signal representing the application of the curve transfer function to the input signal.

A more detailed description of the invention and various implementations thereof are set forth below.

DETAILED DESCRIPTION OF THE INVENTION

Figure 1:
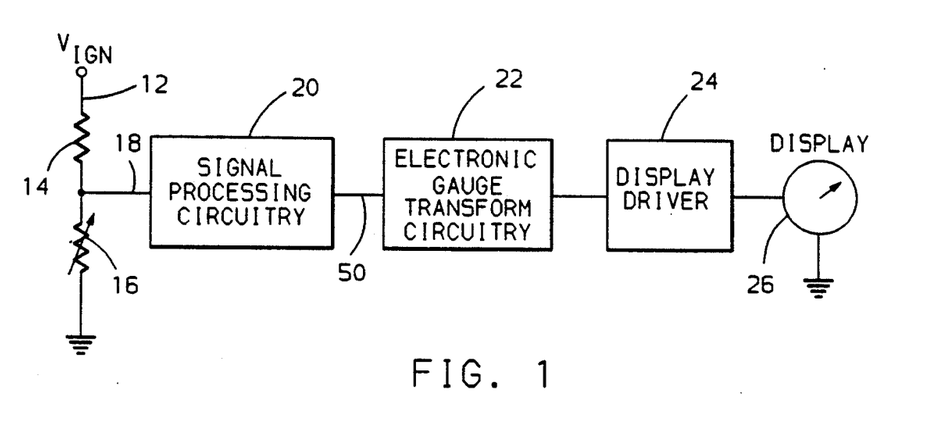
FIG. 1 is a schematic diagram of a vehicle parameter measurement display system in which this invention is implemented.

Referring to FIG. 1, the parameter measurement and display system shown is of the type commonly used for vehicle fuel gauge systems and with which it is suitable to implement this invention. Load resistor 14 and fuel sender 16 are connected in series between ground and line 12, supplying the vehicle ignition voltage. A sender output signal 18 is supplied to signal processing circuitry 20, which performs desired processing functions, such as filtering, on the signal on line 18.

The signal processing circuitry 20 may be of any type well known to those skilled in the art suitable for processing parameter measurement data. An example of preferred processing circuitry is shown in the above mentioned copending U.S. patent application Ser. No. 07/944,158.

The output of the signal processing circuitry 20 is input to the circuitry of this invention, electronic gauge transform circuitry 22. The circuitry 22 transforms the signal output from signal processing circuitry 20 from a signal that would drive display 26 non-linearly to a signal that drives display 26 linearly.

Display driver 24 may comprise an analog to digital converter and an operational amplifier for impedance matching purposes, if needed. The display driver 24 may also include "Gauge Glider" circuitry according to above mentioned copending U.S. patent application Ser. No. 07/943,964. Display 26 is preferably a three coil air core gauge, but may be any other type of suitable display, including a digital display.

Figure 2:
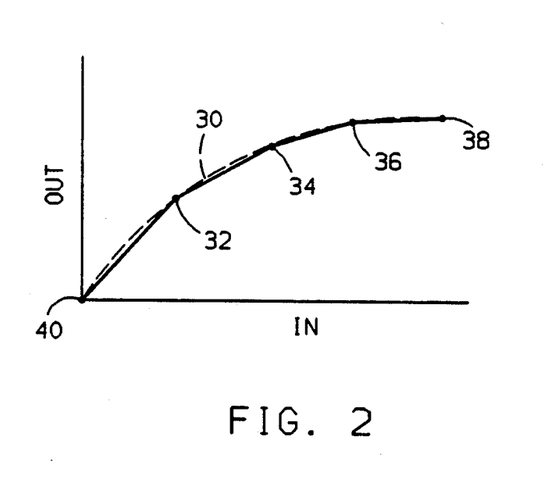
FIG. 2 is graph of a curve transfer function which may be necessary in a system to compensate for system non-linearities.

Referring to FIG. 2, curve 30 represents an overall nonlinearity characteristic for parts of the system in FIG. 1 which may include an irregular shape of the fuel tank (not shown) and nonlinear characteristics of the display 26, which may be especially present in air core gauges. Nonlinearities in the system are compensated for if the electronic gauge transform circuitry 22 applies the nonlinear function represented by curve 30 to the input signal to develop the output signal.

Figure 3:
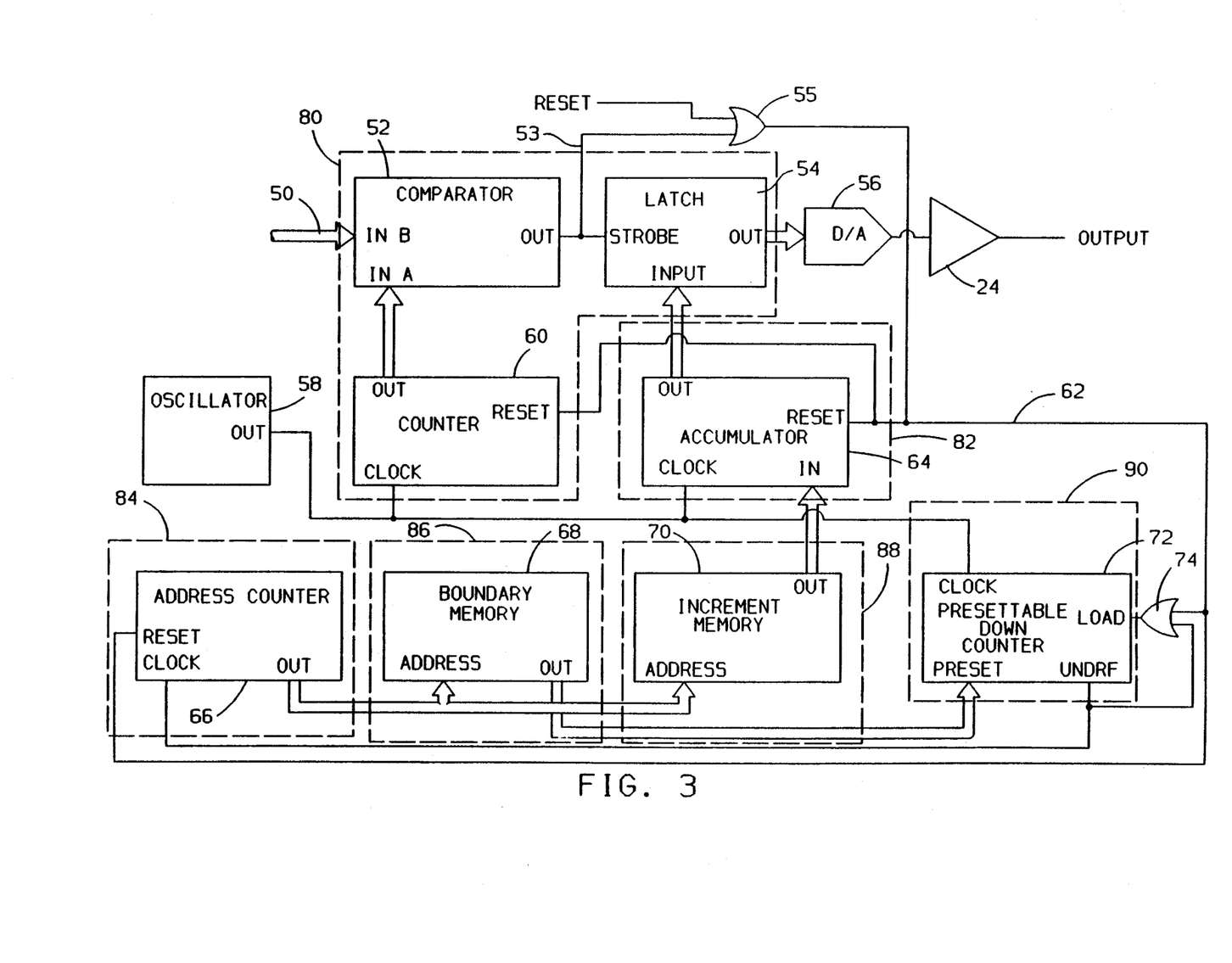
FIG. 3 is a more detailed schematic diagram of an implementation of this invention.

Referring to FIG. 3, the preferred implementation of electronic gauge transform circuitry 22 of this invention is shown. In the circuitry, certain key calibration points (32, 34, 36, 38 and 40, FIG. 2) of curve 30 are programmed into memory and the mapping between those points is interpolated. The input data range is divided into a small number of regions corresponding to the calibration points 32, 34, 36, 38 and 40. Each region has a slope value associated with it. Referring again to FIG. 3, the slope value is incrementally added in accumulator means 82 to produce an input to output mapping which is a piece-wise linear approximation to an ideal mapping transform.

The first memory means 86 stores values representing the "counts" or distances between boundary points 32, 34, 36 and 38 on curve 30. Second memory means 88 stores slope values of lines connecting the adjacent boundary points along curve 30. For example, the slopes of lines connecting points 40 and 32, 32 and 34, 34 and 36 and 36 and 38 are stored in the second memory means 88.

Counter means 90 maintains a position count indicating the position along the curve 30 of the circuit during the data conversion process. The counts between points along curve 30 is maintained with respect to the stored boundary point values, e.g., 32, 34, 36 and 38, so the proper slope value can be selected. Reference 84 indicates a means, responsive to the position count, for selecting from the second memory means 88 the slope value corresponding to the position count of counter means 90.

Accumulator means 82 adds the selected slope value output from second memory means 88 to the output signal of the accumulator, so that the output of accumulator means 82 is a running total of the selected slope values.

Reference 80 designates means for determining when the value of accumulator means 82 corresponds, in relation to curve 30, to the input signal on bus 50. When the output of accumulator means 82 corresponds to the signal on bus 50, the output of accumulator means 82 is selected and output by means 80 as the output signal representing the application of the transfer function of curve 30 to the input signal on bus 50.

A more detailed description of the operation of this invention is now set forth with respect to example implementations for first and second memory means 86 and 88, counter means 90, selecting means 84, accumulator means 82 and determining means 80 shown in FIG. 3.

More particularly, the digital output signal from processing circuitry 20 on bus 50 is coupled to one side of digital comparator 52. If the signal processing circuitry 20 outputs an analog signal, an analog to digital converter is used. The Other input of comparator 52 is fed from the output of counter 60, which has the same digital precision as the signal on bus 50. At the initiation of the conversion process, counter 60 is reset by a control signal on the reset line coupled to line 62 via OR gate 55. The reset control signal also resets address counter 66 and accumulator 64 and resets and loads presettable down counter 72 (explained below). Oscillator 58 then clocks counter 60 until comparator 52 indicates that counter 60 has exceeded the value of the digital signal on bus 50. When counter 60 exceeds the value of the digital signal on bus 50, the conversion (in accumulator 64) is completed (as explained below) and the result is in the output bus of accumulator 64.

A pulse generated at the output of comparator 52 signals the completion of the conversion and, through the strobe input to latch 54, latches the result at the output of accumulator 64 to the output of latch 54. The result in the latch 54 may be used to drive any of a variety of types of displays, including the examples set forth above, and may require digital to analog converter 56. In certain circumstances, a display driver, such as driver 24, comprising a simple unity gain amplifier, may be desirable for impedance matching purposes.

The preferred circuit for implementing the conversion process uses presettable down counter 72 (eight bit). Two small electrically alterable programmable memory arrays 68 and 70 are programmed with data required to perform the mapping operation. The first array 68 contains information as to the location of the boundaries at which the input data space has been divided, e.g., points 32, 34, 36 and 38 (FIG. 2). For example, if the input data ranges from 0 to 255, and the data range is to be approximated by four piece-wise linear approximations, the boundary location memory 68 contains three values from 0 to 255, e.g., 40, 60 (i.e., 100–40), and 60 (i.e., 160–100). The second EAPM array 70 contains an incremental value which represents the slope of the line connecting each point 40, 32, 34, 36 and 38 in FIG. 2. For example, if the values stored in-memory 70 were to have a precision of 12 bits, the values might be 1.4, 1.002 and 0.886, etc..

Presettable down counter 72 is clocked along with comparison counter 60. Address counter 66, which is clocked by the underflow output of down counter 72, generates a digital output which addresses memories 68 and 70. The initial output of boundary memory 68, when address counter 66 is reset, is used to preset down counter 72, and corresponds to point 32 in FIG. 2. The output of the increment memory 70 is used as the input of the accumulator 64, which is initially reset to zero, or, in the case in which an offset is desired to be added to the signal on bus 50, the predetermined offset. This offset may be preprogrammed into the accumulator during manufacture.

With each clock cycle, comparison counter 60 is incremented, presettable down counter 72 is decremented, and accumulator 64 adds the incremental value representing the slope of the transfer function, which is contained in the output of memory 70, to the value last formed in adder accumulator 64. This process continues until down counter 72 underflows, causing address counter 66 to increment, forming a new address input to memories 68 and 70. The new data output from memory 68 (e.g., corresponding to the difference between points 34 and 32, FIG. 2, and the next will correspond to the difference between points 36 and 34, and then to the difference between points 38 and 36) is loaded to the preset input of down counter 72 at this time, i.e., counter 72 receives the load signal via the OR operation of the underflow output with the reset signal, through gate 74. The clocking continues with the new incremental value, from increment memory 70, added to accumulator 64.

The operation continues in the same manner as described above until comparator 52 produces an output which strobes latch 54. At which point the output of accumulator 64 is latched into latch 54 and feeds the display driver circuitry. If the proper slope increments, e.g., for the function in FIG. 2, are programmed into the memory 70, the fuel gauge display is driven substantially linearly, compensating for nonlinearities of the remainder of the system.

In a cyclical manner, reset signals on line 62 cause the above process to repeat, periodically updating the display drive signal. The periodic reset signals may be generated with the completion of every conversion routine by coupling the signal on line 53 to line 62 as the reset signal via OR gate 55. When counter 60 receives the reset signal, its output is reset, in turn causing the output of comparator 52 to go low. When the output of comparator 52 goes low, line 62 also goes low, allowing the conversion process to cycle again. With the completion of each cycle, the output signal from latch 54 is updated.

Alternatively, a periodic reset signal at a set clock rate slower than the time necessary for one cycle of the circuit can be coupled to line 62 via a signal applied to the reset line input to OR gate 55. If comparator 52 and counter 60 maintain eight bits of precision, then the periodic reset signal coupled to line 62 is at least 256 times slower than the clock signal from oscillator 58. This ensures that the conversion process is able to be completed before another reset signal is received by the circuit.

Figure 4:
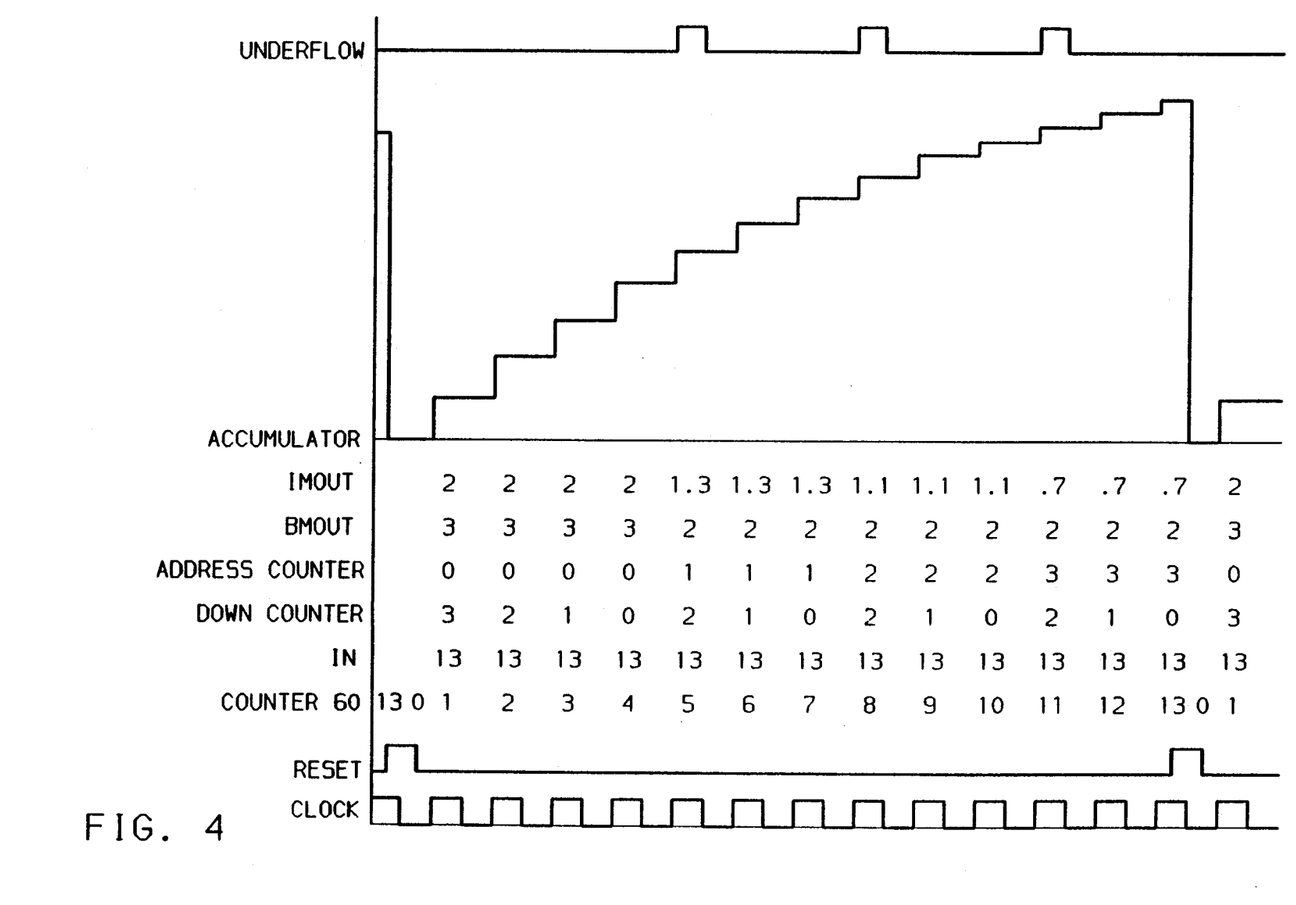
FIG. 4 is an example timing diagram for the circuit of FIG. 3.

The above operation may be better understood with reference to the timing diagram shown in FIG. 4. The timing diagram shows the output of accumulator 64 (ACCUMULATOR) with reference to the clock signal from oscillator 58 (CLOCK), the reset signal on line 62 (RESET), the underflow signal from counter 72 (UNDERFLOW), decimal values for the outputs of counters 60 (COUNTER 60), 66 (ADDRESS COUNTER) and 72 (DOWN COUNTER), memories 68 (BMOUT) and 70 (IMOUT) and the input signal on bus 50 (IN).

The timing diagram shown in FIG. 4 illustrates circuit operation in an example situation in which the fuel tank is at or near full and is simplified with one clock pulse shown for every twelve actual pulses, assuming eight bit precision.

Figure 5:
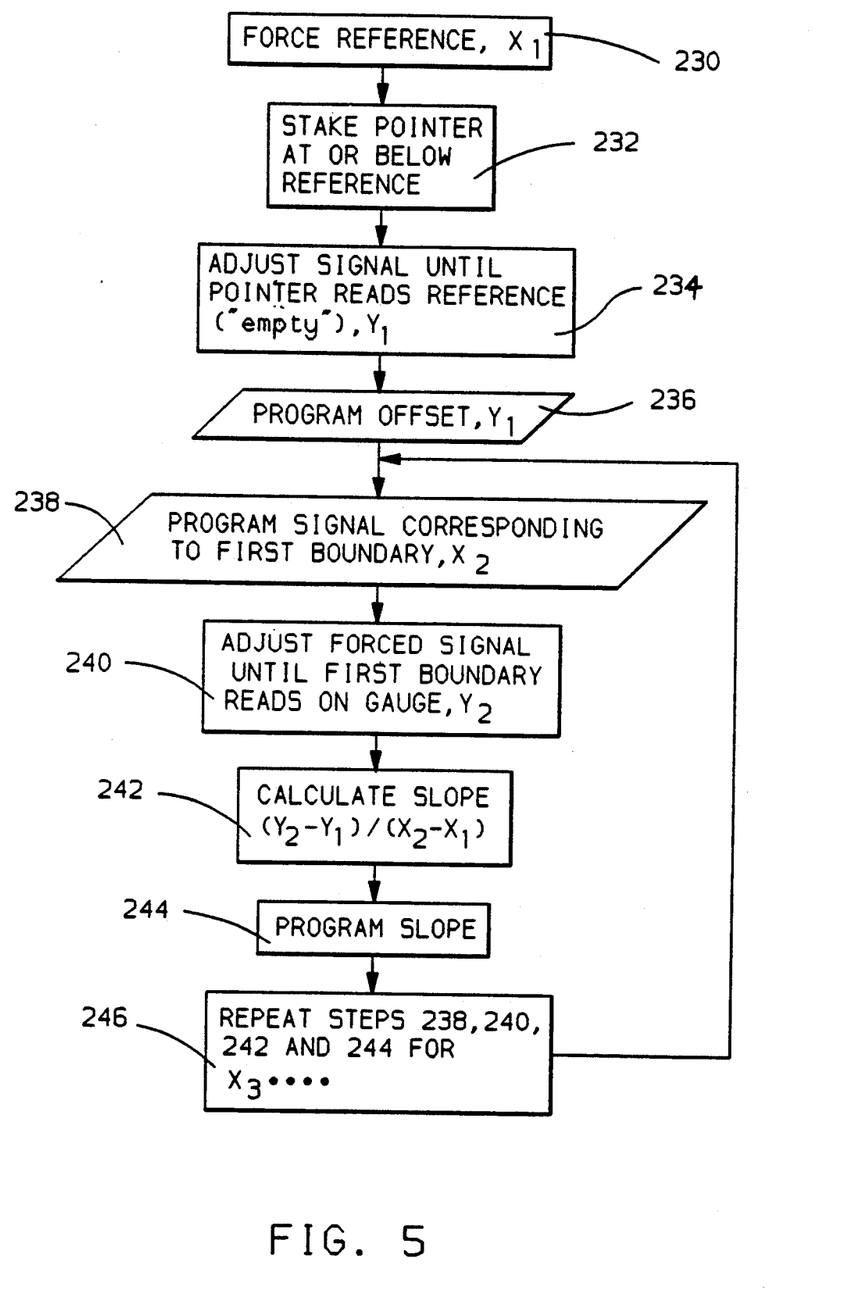
FIG. 5 is an illustration of a method for implementing the apparatus of this invention.

FIG. 5 shows the preferred method of manufacture of the display systems implementing this invention. The preferred display implementation is an analog gauge, such as an air core gauge. When analog gauges are manufactured in displays, typically the gauge is installed into the display without the pointer attached, and then the pointer is attached onto the shaft of the gauge. The attachment of the pointer to the shaft is called staking, and usually involves simply pressing the pointer onto the shaft.

The preferred method for manufacture requires, first, forcing a reference signal onto the circuit, such as at bus 50 (block 230). For fuel gauge systems, the reference signal preferably corresponds to the signal, $x_1$, that results on bus 50 corresponding to an empty fuel tank. Then, at block 232, the pointer is staked to the gauge, as close to reading the reference position, e.g., "empty," as possible. At block 234, the signal on bus 50 is changed until the pointer actually indicates the reference position, e.g., "empty," the resulting signal being referred to as $y_1$. At block 236, the value of $y_1$ is programmed to accumulator 64 as the (lower boundary if the first reference is the lower boundary and) offset.

At step 238, a signal, $x_2$, known to correspond to the fuel level corresponding to the first boundary (e.g., point 32) is programmed into boundary memory 68. For example, if the first boundary 32 is to be the ¼ full fuel level, $x_2$ may be determined by simply filling a sample fuel tank to ¼ full and determining the signal on bus 50. Presumably, this need only be done once for each system design. At step 240, the signal forced on bus 50 is changed until the gauge actually indicates the first boundary, this resultant signal is referred to as $y_2$. At step 242, the slope. increment used with the system in FIG. 13 is calculated as: slope=$(y_2-y_1)/(x_2-x_1)$. This value is programmed, at step 244, into the incremental memory 70 as the slope below the first boundary.

Step 246 indicates that steps 238–244 are repeated for the rest of the boundaries 34, 36 and 38. Any number of boundaries may be implemented, and determination as to the number of boundaries will be made by the system designer with respect to the desired system accuracy and the desire to minimize required memory. In one example, it may be desirable to have boundaries corresponding to ¼ full, ½ full, and ¾ full. In such case, when steps 238–244 are repeated for the second boundary, $y_2$ and $x_2$ for the first boundary become the new $y_1$ and $x_1$, and a new $x_2$ (previously determined by experimentation as the signal corresponding to a ½ full tank) is used and a new $y_2$ is determined at step 240. The method is likewise repeated for each boundary.

For each boundary implemented, two memory bytes are needed (assuming eight bit precision), one in boundary memory 68 and one in increment memory 70. For a system using boundaries similar to those in FIG. 2, a total of eight bytes of memory are used. This is a large savings over the 256 bytes of memory that are necessary if a look-up table is used.

Using the above method, the augmentations of this invention can be easily implemented by one skilled in the art, providing a fuel gauge linearly responsive to the actual amount of fuel in the fuel tank. The boundaries described above are just example boundaries and a designer may set the boundaries as desired, including eliminating multiple boundaries all together.

Figure 6:
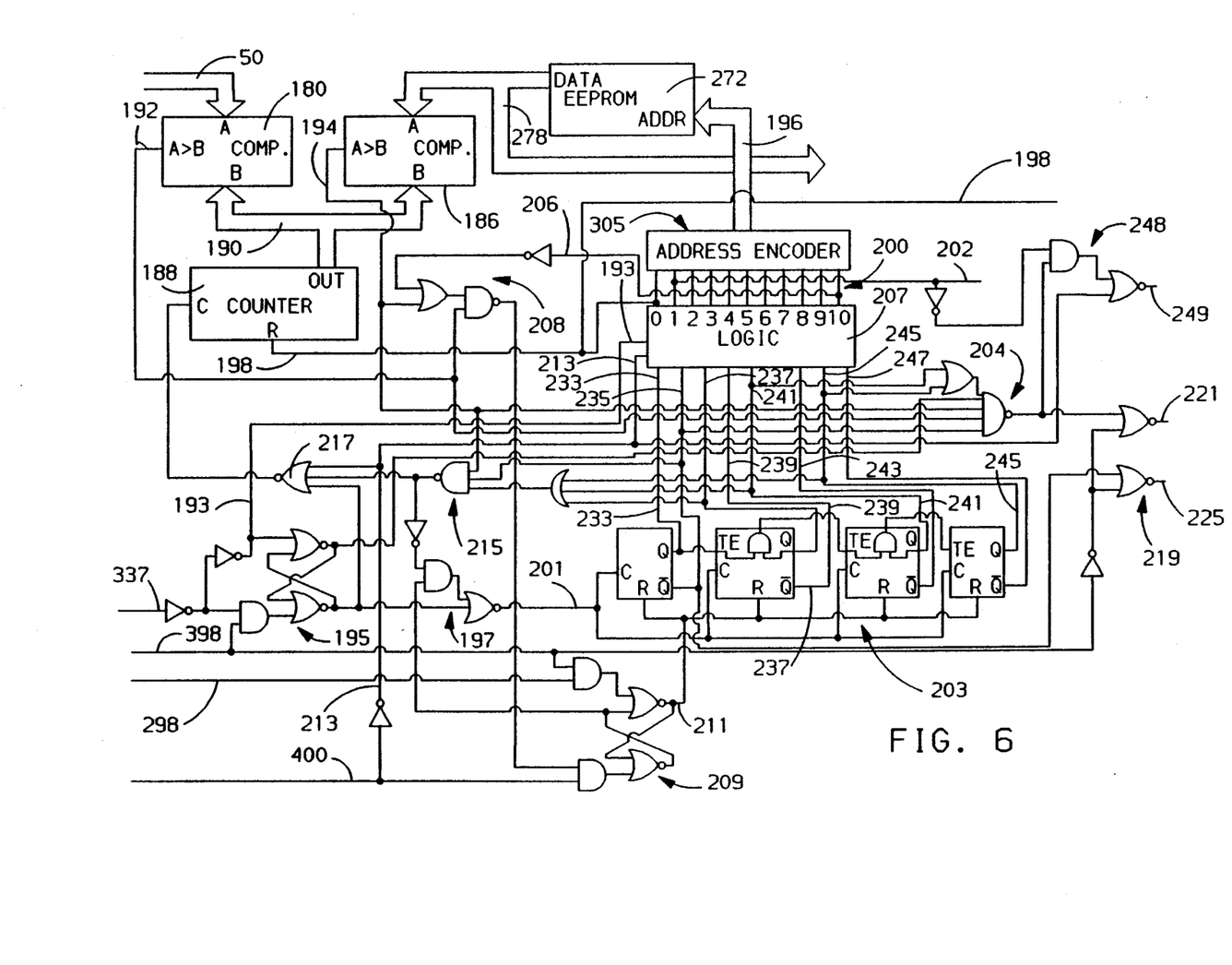
FIGS. 6, 7 and 8 illustrate an alternative implementation of this invention.
Figure 7:
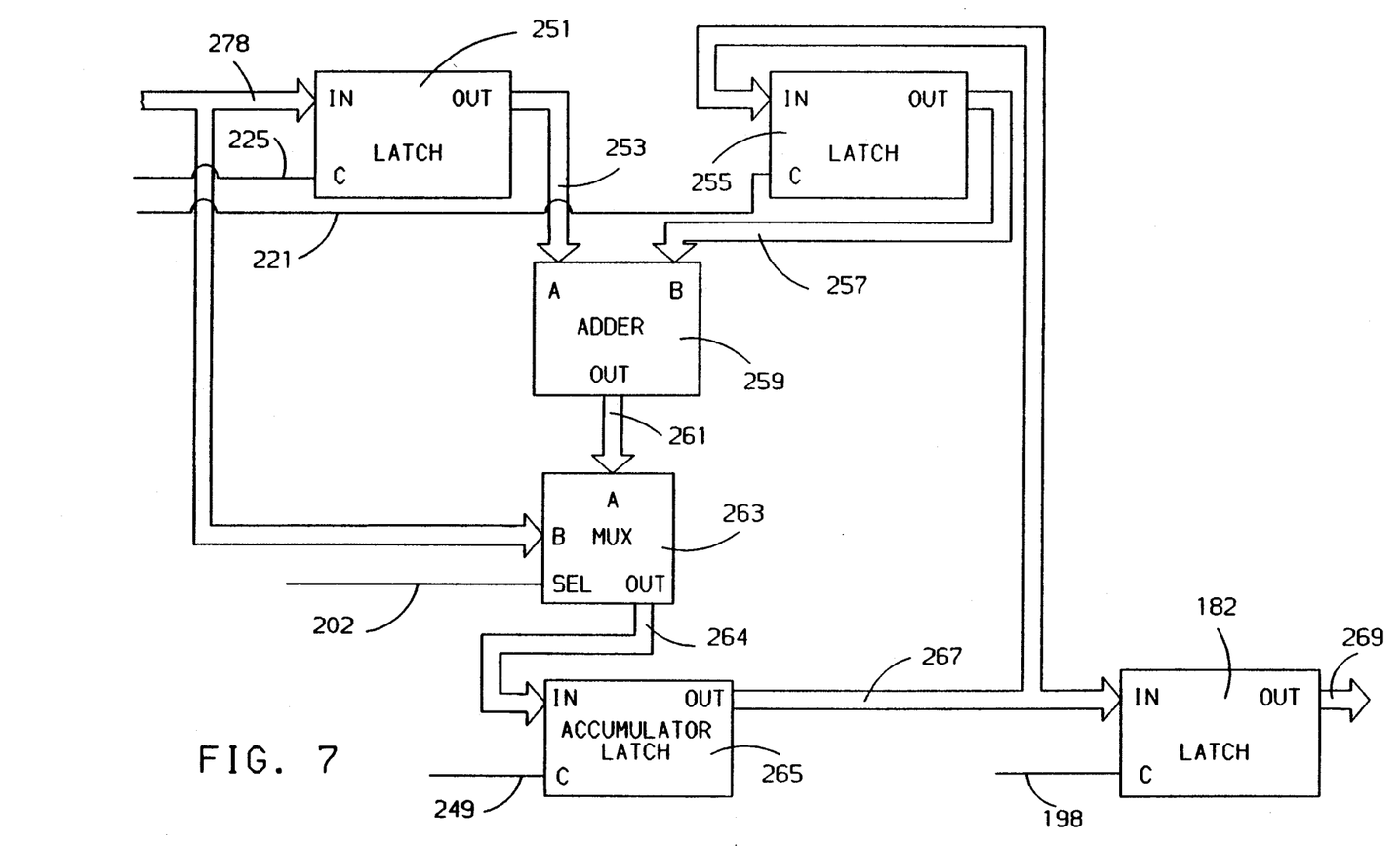
Figure 8:
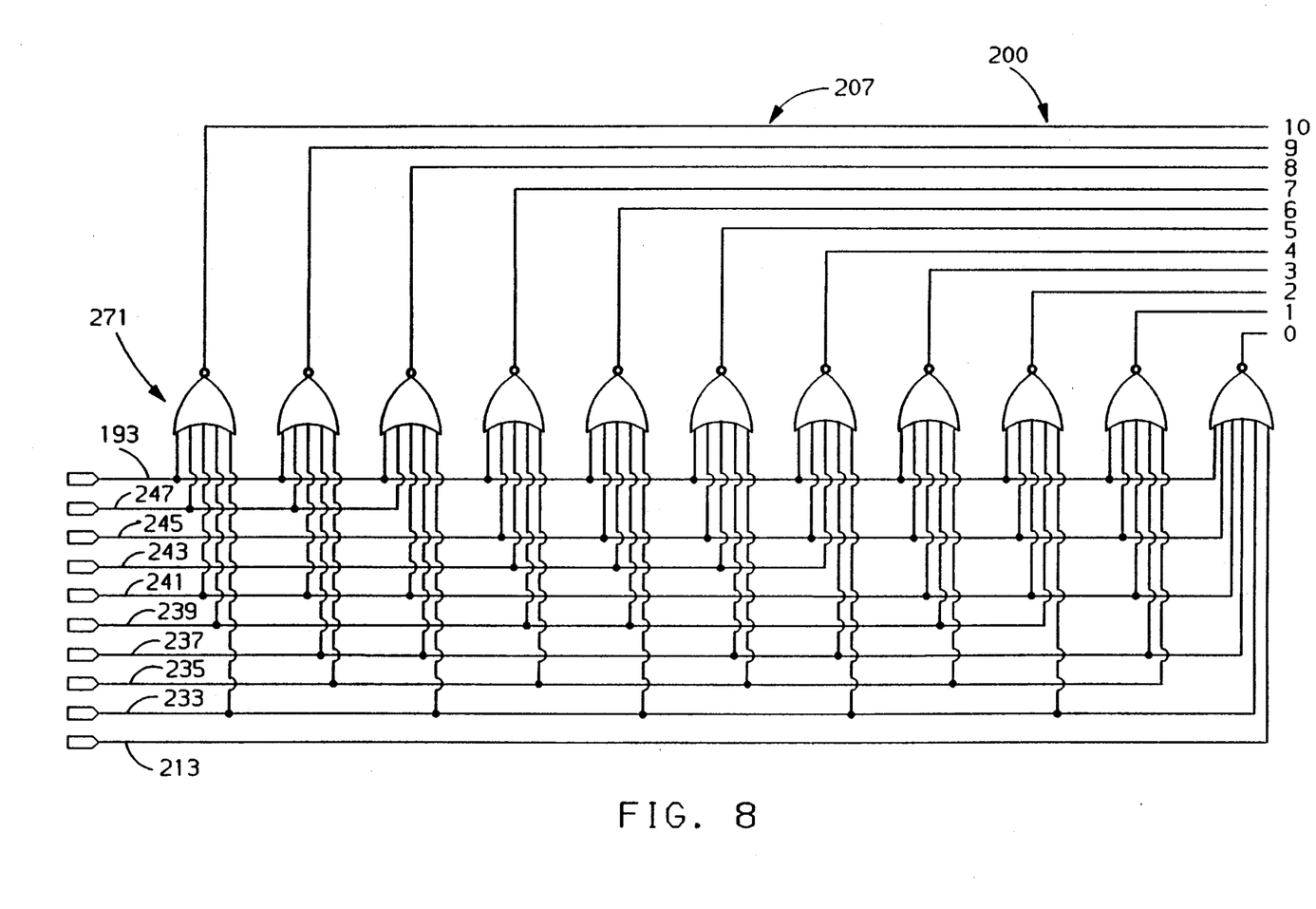

Referring to FIGS. 6, 7 and 8, an implementation of this invention that requires only one memory unit and minimal silicon area is shown.

More particularly, the digital signal on bus 50 is coupled to one side of digital comparator 180. The other input of comparator 180 is fed from the output of counter 188, which has the same digital precision as the signal on bus 50 and maintains the position count. At the initiation of the conversion process, which may occur with every change in the bus 50, counter 188 is reset to zero and accumulator 265 is cleared to zero. Latch 251 is loaded with zero value. A signal on bus 196 addresses memory 272 to load the offset point 40 in FIG. 2 into data bus 278, provided to the A input of comparator 186. Counter 188 is clocked until the output on bus 190 equals the value of point 40 in comparator 186.

When comparator 186 indicates that the output of counter 188 is equal to point 40, latch 251 is loaded with the first slope value from memory 272 and then bus 278 at the A input to comparator 186 is loaded with the value of the first break point 32 (FIG. 2). The first slope value is the slope of the line connecting points 40 and 32 (FIG. 2). Line 198 then clocks the counter 188 until the value on bus 190 is equal to the value of point 32 or the value on bus 50. With each clock of the counter 188, the slope measurement value in latch 251 is added to the value in latch 255, the accumulated value. The adding is performed by adder 259, and the result gets latched into accumulator 265.

Once point 32 is reached by counter 188, the next slope increment, of the line between points 32 and 34 (FIG. 2), is latched into latch 251 and the value of point 34 is provided to the A input of comparator 186. The same accumulation process continues until counter 188 reaches either point 34 or the value on bus 50. If the value of counter 188 does not reach the value on bus 50 before it reaches point 34, then the next slope value is latched into latch 251 and the next point, point 36 (FIG. 2), is provided to the A input of comparator 186. Again, the accumulation process continues until the output value of counter 188 reaches either point 36 or the value on bus 50. Once point 36 is reached, the slope value for the line connecting points 36 and 38 is loaded into latch 251 and point 38 is provided to the A input of comparator 186. Again the accumulation process continues until the output value of counter 188 reaches either point 38 or the value on bus 50.

When point 38 is reached, the process ends and the value in output bus 267 of accumulator 265, indicating a full fuel tank, is latched into output latch 182, which has an output connected to bus 269. If during any time during the above process, the value on bus 190 is equal to the value on bus 50, comparator 180 outputs a signal on line 192, which ends the cycling of the circuit and the signal on line 198 latches the value in accumulator 265 into output latch 182. In this manner, the curve fitter 22 performs a function on the signal on bus 50 which is a piece-wise linear approximation of the ideal transfer function, e.g., curve 30, FIG. 2, for compensating for non-linearities in the system.

The curve fitter shown in FIGS. 6–8 is controlled by counter 203, logic circuitry 207 and the shown gates. The curve fitter shown is triggered by a signal on line 298, which may be set to correspond to a change in bus 50. When the signal on line 298 occurs, gates 209 provide a reset signal on line 211 which resets counter 203. Counter 203 is enabled by a signal on line 337 and clocked with the signal on line 398 via gates 195 and 197, which provide the resultant clock signal on line 201.

Output lines 235, 237, 241, and 245 of counter 203 are coupled to gates 215, which are coupled to gate 217, and the clock input of counter 188. Logic circuitry 207, shown in detail in FIG. 8, counter 203 and gates 204, 219 and 248 control the functions of the circuit which performs the piece-wise linear transform by cycling through eleven states, States 0–10. The logic circuitry 207 comprises a series of eleven NOR gates which select the states in response to the output lines of counter 203 and line 193. Address encoder 305 provides the necessary address commands on bus 196 in response to lines 200 output from logic circuitry 207. Address encoders of the type used here are easily implemented by those skilled in the art.

In State 0, counter 188 is reset through a command on line 198, memory 272 is addressed by bus 196 to a location in which the output is zero, multiplexer 263 is selected through a command on line 202 so that the data on bus 278 is coupled to accumulator 265, and accumulator 265 and latch 251 are commanded through lines 249 and 225 to load the zero value from bus 278. In this manner, the accumulator is cleared.

In State 1, a word on bus 196 addresses memory 272 to provide on bus 278 the minimum output value for the circuit, which is coupled via multiplexer 263 to accumulator 265, and latched in with a command on line 249.

In State 2, a word on bus 196 addresses memory 272 to provide the value of point 40 (FIG. 2) on bus 278. Counter 188 is then counted until the output on bus 190 reaches the value of point 40. Multiplexer 263 is selected through line 202 so that the output of adder 259, on bus 261, is coupled to accumulator 265 through bus 264. If at any point during this state, the value on counter 188 is greater than the signal on bus 50, then the cycle is terminated and the value of point 40 in accumulator 265 is loaded into output latch 182.

In State 3, bus 196 addresses in memory the slope of the line between points 40 and 32 and a signal on line 225 loads the slope value into latch 251.

In State 4, bus 196 addresses in memory the value of point 32, which is provided to the A input of comparator 186 via bus 278. Counter 188 is then counted up by clock pulses on the clock input until either point 32 is reached or the value on bus 50 is reached. During this time latch 255 and accumulator 265 are cycled, so that the accumulator output in bus 267 increments by the slope value in latch 251 with each count of counter 188. If the value on bus 50 is reached by the counter 188, the cycle is terminated by the signal on line 192, which resets counter 203 and brings the signal on line 198 high, which in turn latches in the result on the output bus 267 of accumulator 265 to latch 182. If the point 32 is reached, the circuit continues to State 5.

State 5 is similar to State 3, except the slope value for the line between points 32 and 34 is loaded into latch 251. State 6 is similar to State 4, with the point 34 provided to the A input of comparator 186 via bus 278. States 7 and 9 are similar to States 5 and 3, with the slope values for the lines between points 34 and 36 and between points 36 and 38 loaded into latch 251. Likewise, States 8 and 10 are similar to States 4 and 6, with points 36 and 38 loaded onto bus 278 and provided to the A input of comparator 186.

If the cycle is not terminated at any point during States 2, 4, 6, 8 or 10 due to a signal on line 192 indicating the output of counter 188 being equal to the value on bus 50, then at the conclusion of State 10, counter 203 is reset and the value for the point 38 is latched into the output latch 182 with a signal on line 198.

The result in the latch 182 is provided on bus 269 and may be used to drive a digital display, or may be input into a digital to analog converter and used to drive an analog display.

The above described implementation are example implementations of this invention and are not limiting on its scope. Moreover, various improvements and modifications to this invention may occur to those skilled in the art and will fall within the scope of this invention as set forth below.

The embodiments of the invention in which an exclusive property or privilege is claimed are defined as follows:

1. An apparatus for applying a curve transfer function to a signal, comprising:

first counting means for periodically incrementing a comparison count signal in response to a clock signal;

comparison means for receiving an input signal and the comparison count and for outputting a comparison output signal at a time when the input signal equals the comparison count;

second counting means for periodically decrementing a curve position signal in response to the clock signal, wherein the presettable down counter is presettable to a boundary count signal;

accumulator means for periodically incrementing, by a slope increment signal, an accumulator output signal in response to the clock signal; and means for outputting an output signal equal to the accumulator output signal at the time when the comparison output signal is output by the comparison means, wherein the output signal represents a curve transfer function applied to the input signal.

2. The apparatus set forth in claim 1, also comprising, memory means for supplying the slope increment signal to the accumulator means and a boundary count difference signal to the second counting means.

3. The apparatus set forth in claim 2, wherein, when the second counting means underflows, it outputs an underflow signal, wherein the apparatus also comprises third counting means, incrementing an address signal in response to the underflow signal, for addressing the memory means.

4. The apparatus set forth in claim 3, also comprising means for periodically applying a reset signal to the accumulator means and the first, second and third counting means so that the accumulator means and the counters are periodically reset and so that the output signal is periodically updated.

5. The apparatus set forth in claim 2, wherein the memory means contains pairs of memory address locations, each pair of memory address locations containing values for the boundary count difference signal and a slope increment signal, so that when each memory address location is addressed, the value for the boundary count signal contained therein is supplied to the second counting means and the value for the slope increment signal contained therein is supplied to the accumulator means.

6. An apparatus for compensating for nonlinearities in a parameter display system, comprising:

a first counter receiving a reset signal and a clock signal comprising a series of pulses, resetting to zero when the reset signal is received and incrementing a comparison count signal with every pulse of the clock signal;

a comparator with first and second comparison inputs, the first comparison input receiving an input signal and the second comparison input receiving the comparison count signal, the comparator providing a comparison output signal when the input signal equals the comparison count signal;

a first set of memory containing curve boundary signals;

a second set of memory containing slope increment signals;

a second counter coupled to the first and second sets of memory and receiving the clock and reset signals, the second counter containing a curve position count being presettable to the boundary signal received from the first set of memory, decrementing the curve position count signal with every pulse of the clock signal, providing an underflow signal when the presettable down counter underflows and resetting with every underflow signal to a count equal to the boundary signal supplied by the first set of memory;

a third counter, coupled to the first and second sets of memory to address the first and second sets of memory with an address count signal, receiving the underflow and the reset signals, incrementing the address count signal with every underflow signal and resetting with every reset signal;

an accumulator receiving the clock signal and the reset signal and coupled to the second set of memory to receive the slope increment signal therefrom, the accumulator resetting to zero in response to the reset signal and, with every pulse of the clock signal, periodically incrementing, by the slope increment signal, an accumulator output signal; and a data latch coupled to the comparator and to the accumulator, the data latch receiving the comparison output signal from the comparator, latching in the accumulator output signal in response to the comparison output signal, and providing the latched comparison output signal as a circuit output signal, thereby compensating for nonlinearities of the system.

7. The apparatus set forth in claim 6, also comprising means for providing the clock signal and means for periodically providing the reset signal.

8. The apparatus set forth in claim 7 wherein the first counter is an eight bit counter and the reset signal has a frequency at least 256 times slower than a frequency of the clock signal.

9. The apparatus set forth in claim 6, also comprising a display device coupled to the data latch, linearly displaying a measurement of the parameter.

10. The apparatus set forth in claim 9, wherein the display device is an analog gauge.

11. An apparatus for applying a curve transfer function to an input signal, comprising:

first memory means for storing values representing boundary points along a curve of the transfer function;

second memory means for storing slope values of lines connecting adjacent boundary points along the curve;

counter means for maintaining a position count indicating position along the curve of the transfer function with respect to the stored boundary point values;

means, responsive to the position count, for selecting, from the second memory means, the slope value corresponding to the position count;

accumulator means for adding the selected slope value to an accumulator output value; and means for determining when the accumulator output value corresponds to the input signal, and for selecting the corresponding accumulator output value as an output signal representing the application of the curve transfer function to the input signal.

12. An apparatus comprising:
   means for receiving an input signal;
   memory means for storing (i) a first set of addressable data comprising points along a curve, and (ii) a second set of addressable data comprising slope increments of lines connecting consecutive points along the curve;
   a counter with an output count incremented in response to a clock pulse;
   a first comparator with a first input coupled to the output count and a second input coupled to the input signal, the first comparator comparing the output count to the input signal and providing a first comparison output in response;
   means, responsive to the output count and a second comparison output, for addressing the memory means and for selecting a point from the first set of addressable data;
   the second comparator with a first input coupled to the output count and a second input coupled to the memory means, the second comparator comparing the selected point to the count output and providing the second comparison output in response;
   means, responsive to the output count for addressing the memory means and for selecting a slope increment from the second set of data;
   means for adding the selected slope increment to an accumulator output;
   an accumulator providing the accumulator output; and
   means for outputting the accumulator output responsive to the first comparison output as a piece-wise linear approximation of a transform of the input signal.

13. An apparatus comprising:
   means for receiving an input signal;
   memory means for storing first and second sets of addressable data, the first set of data comprising a set of distances along a curve and the second set of data comprising slope increments of lines connecting consecutive points along the curve;
   means for maintaining a position count along the curve;
   means for addressing the memory and selecting from the first set of addressable data one data point responsive to the position count means and for selecting from the second set of addressable data one slope increment responsive to the position count means and the selected data point;
   means for adding the selected slope increment to an accumulated value; and
   means for outputting the accumulated value when the position count equals the input signal, whereby the output accumulated value equals a piece-wise linear approximation of a transform of the input signal.

14. The apparatus set forth in claim 13, also comprising:
   means for sensing a level of fuel in a fuel tank and for providing the input signal responsive thereto; and
   means for displaying a level of fuel in the fuel tank responsive to the output accumulated value, wherein the display means linearly displays the level of fuel in the tank.

15. A paramter measurement and display apparatus, comprising:
   means for sensing a level of a parameter and for developing a level signal;
   memory means for storing boundary point values and slope values between the boundary point values representing a piece-wise linear approximateion of a nonlinear curve transfer function characterizing nonlinearities inherent in the parameter and display apparatus;
   means for transforming the level signal to develop a resulting output signal based upon the stored boundary point values and the slope values between the boundary point values to compensate for the inherent nonlinearities of the apparatus; and
   means for driving a display in response to the output signal.

* * * * *